United States Patent
Popp et al.

(10) Patent No.: US 8,265,434 B2
(45) Date of Patent: Sep. 11, 2012

(54) LENS SYSTEM WITH POSITION ADJUSTMENT

(75) Inventors: Gregor Popp, Munich (DE); Matthias Rank, Willmering (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 504 days.

(21) Appl. No.: 12/478,556

(22) Filed: Jun. 4, 2009

(65) Prior Publication Data

US 2009/0303580 A1 Dec. 10, 2009

(30) Foreign Application Priority Data

Jun. 6, 2008 (DE) .................. 10 2008 002 248

(51) Int. Cl.
*G02B 6/32* (2006.01)
*G02B 6/40* (2006.01)

(52) U.S. Cl. ............ 385/26; 385/31; 385/33; 385/34; 385/35; 385/39; 385/71; 385/72; 385/73; 385/74

(58) Field of Classification Search .......... 385/26, 385/31, 33–35, 39, 71, 72, 73, 74
See application file for complete search history.

(56) References Cited

U.S. PATENT DOCUMENTS

| | | | |
|---|---|---|---|
| 4,109,998 A | 8/1978 | Iverson | |
| 4,325,584 A | 4/1982 | Christ et al. | |
| 4,641,915 A | 2/1987 | Asakawa et al. | |
| 4,725,116 A | 2/1988 | Spencer et al. | |
| 4,858,292 A | 8/1989 | Buhlmann et al. | |
| 4,872,737 A | 10/1989 | Fukahori et al. | |
| 4,981,335 A * | 1/1991 | Gaebe | 385/33 |
| 5,039,193 A | 8/1991 | Snow et al. | |
| 5,073,040 A | 12/1991 | Guinard | |
| 5,115,481 A | 5/1992 | Buhrer | |
| 5,157,745 A | 10/1992 | Ames | |
| 5,271,076 A | 12/1993 | Ames | |
| 5,317,659 A | 5/1994 | Lee | |
| 5,402,509 A * | 3/1995 | Fukushima | 385/33 |
| 5,442,721 A * | 8/1995 | Ames | 385/26 |
| 5,481,629 A * | 1/1996 | Tabuchi | 385/14 |
| 5,568,578 A | 10/1996 | Ames | |
| 5,588,077 A | 12/1996 | Woodside | |
| 6,192,175 B1 | 2/2001 | Li et al. | |
| 6,236,787 B1 * | 5/2001 | Laughlin | 385/52 |

(Continued)

FOREIGN PATENT DOCUMENTS

AT 410603 6/2003

(Continued)

OTHER PUBLICATIONS

Hecht, Optik, © 1974 Addison-Wesley Publishing, 8 pages.

(Continued)

*Primary Examiner* — Eric Bolda
(74) *Attorney, Agent, or Firm* — Kevin L. Daffer; Daffer McDaniel, LLP

(57) ABSTRACT

In a lens system, such as for use in optical rotary joints, obliquely tilted cavities are inserted in a light path between light-waveguides and lenses to be coupled thereto in order to compensate lateral displacements between the light waveguides and the lenses. The cavities are filled with an optical medium having a predetermined refractive index in order to achieve a parallel displacement of a light-ray path, so that the ray path passes centrally through the lenses.

11 Claims, 4 Drawing Sheets

U.S. PATENT DOCUMENTS

| | | | |
|---|---|---|---|
| 6,263,133 | B1 | 7/2001 | Hamm |
| 6,360,032 | B1 | 3/2002 | Berger et al. |
| 6,441,960 | B1 | 8/2002 | Wang et al. |
| 6,782,160 | B2 | 8/2004 | Townsend et al. |
| 6,823,142 | B1 | 11/2004 | Tanaka et al. |
| 6,862,383 | B2 * | 3/2005 | Kikuchi et al. .............. 385/33 |
| 7,076,131 | B2 | 7/2006 | Bolle |
| 7,142,747 | B2 * | 11/2006 | Oosterhuis et al. ........... 385/26 |
| 7,239,776 | B2 | 7/2007 | Oosterhuis et al. |
| 7,246,949 | B2 | 7/2007 | Thiele et al. |
| 7,298,538 | B2 | 11/2007 | Guynn et al. |
| 7,352,929 | B2 | 4/2008 | Hagen et al. |
| 7,372,230 | B2 | 5/2008 | McKay |
| 7,373,041 | B2 | 5/2008 | Popp |
| 7,433,556 | B1 | 10/2008 | Popp |
| 2002/0094163 | A1 | 7/2002 | Ooyama et al. |
| 2003/0099454 | A1 | 5/2003 | Chang |
| 2004/0017984 | A1 | 1/2004 | Thiele et al. |
| 2005/0036735 | A1 | 2/2005 | Oosterhuis et al. |
| 2005/0119529 | A1 | 6/2005 | Farr et al. |
| 2005/0141815 | A1 * | 6/2005 | Pan et al. .................... 385/47 |
| 2006/0110092 | A1 | 5/2006 | Ikeda |
| 2007/0019908 | A1 | 1/2007 | O'Brien et al. |
| 2007/0053632 | A1 * | 3/2007 | Popp ........................... 385/26 |
| 2007/0237528 | A1 | 10/2007 | Popp |
| 2008/0106711 | A1 | 5/2008 | Beierl et al. |
| 2008/0175535 | A1 | 7/2008 | Popp et al. |
| 2008/0226231 | A1 * | 9/2008 | Popp ........................... 385/34 |
| 2008/0317407 | A1 | 12/2008 | Popp |
| 2010/0134803 | A1 * | 6/2010 | Baier et al. ................ 356/498 |

FOREIGN PATENT DOCUMENTS

| | | |
|---|---|---|
| DE | 1300002 | 7/1969 |
| DE | 1575515 | 3/1970 |
| DE | 74062 | 6/1970 |
| DE | 1772492 | 2/1972 |
| DE | 3207469 | 9/1982 |
| DE | 19809823 | 9/1999 |
| DE | 20105786 | 7/2001 |
| DE | 69704783 | 11/2001 |
| DE | 10029206 | 1/2002 |
| DE | 102004026498 | 12/2005 |
| DE | 60019966 | 2/2006 |
| DE | 102006022023 | 11/2006 |
| DE | 102005056899 | 5/2007 |
| EP | 0490054 | 6/1992 |
| EP | 0588039 | 3/1994 |
| EP | 1345051 | 9/2003 |
| EP | 1359452 | 11/2003 |
| EP | 1476969 | 1/2005 |
| GB | 2005044 | 4/1979 |
| JP | 63208821 | 8/1988 |
| JP | 2113213 | 4/1990 |
| JP | 2141708 | 5/1990 |
| WO | 01/98801 | 12/2001 |
| WO | 03/069392 | 8/2003 |

OTHER PUBLICATIONS

Schleifring, "Mikrooptischer Dreguebertrager," 2005, 12 pages.
U.S. Appl. No. 11/962,333, filed Dec. 21, 2007.
Office Action mailed Jul. 8, 2008 for U.S. Appl. No. 12/045,965.
Final Office Action mailed Mar. 16, 2009 for U.S. Appl. No. 12/045,965.
Office Action mailed Apr. 5, 2007 for U.S. Appl. No. 11/469,004.
Notice of Allowance mailed Oct. 10, 2007 for U.S. Appl. No. 11/469,004.
Notice of Allowance mailed Jan. 7, 2008 for U.S. Appl. No. 11/469,004.
Office Action mailed Feb. 22, 2008 for U.S. Appl. No. 11/766,361.
Notice of Allowance mailed Jul. 14, 2008 for U.S. Appl. No. 11/766,361.
Office Action mailed Apr. 3, 2009 for U.S. Appl. No. 12/144,106.
Office Action mailed Oct. 18, 2010 for U.S. Appl. No. 11/962,333.
Office Action Mailed Oct. 30, 2009 for U.S. Appl. No. 11/563,371.
Notice of Allowance mailed Jan. 26, 2010 for U.S. Appl. No. 11/563,371.
Office Action mailed Feb. 1, 2010 for U.S. Appl. No. 12/144,106.
Notice of Allowance mailed Jan. 12, 2010 for U.S. Appl. No. 12/045,965.
Office Action mailed Aug. 28, 2009 for U.S. Appl. No. 12/045,965.

* cited by examiner

LENS SYSTEM WITH POSITION ADJUSTMENT

PRIORITY CLAIM

The present application claims priority to pending German Patent Application No. 102008002248.9 filed on Jun. 6, 2008.

BACKGROUND OF THE INVENTION

1. Field of the Invention

The invention relates to a lens system particularly for use in optical rotary joints, an optical rotary joint using the lens system, and also to a method for adjusting a lens system of this kind.

2. Description of Related Art

Various transmission systems are known for transmitting optical signals between units that are rotatable relative to each other.

U.S. Pat. No. 5,568,578 discloses an optical rotary joint for a plurality of channels, having a Dove prism. An arrangement having a plurality of GRIN lenses is provided for coupling light into or out of glass fibers.

U.S. Patent Application Publication No. 2005/0036735 discloses an optical rotary joint for a plurality of channels, having a Dove prism as a derotating element. Light is coupled-in from supply light-waveguides via collimators into a Dove prism by means of which it is derotated, and is fed into leading-away light-waveguides via further collimators.

Another kind of optical rotary joint is disclosed in International Publication No. WO 01/98801. A micro-optical system is set out therein which has optical and mechanical components in the form of a one-piece component. A substantially higher packing density of single glass fibers can be achieved with this embodiment.

With the systems known from prior art, relatively large efforts are needed for exact adjustment of the collimators or the micro-lens arrays.

BRIEF SUMMARY OF THE INVENTION

Low cost optical rotary joints and lens systems which can be manufactured reproducibly and can be adjusted with simple effort are provided. In addition, a method for adjusting a lens system of this kind is provided. The following are mere exemplary embodiments of the lens systems, optical rotary joints, and method, but are not to be construed in any way to limit the subject matter of the claims.

An embodiment of a lens system includes a micro-lens array having at least one lens for at least one of coupling light into and coupling light out of at least one light-waveguide and at least one plane-parallel cavity having two plates defining an inner space limited by parallel faces and located in a light-ray path between the at least one light-waveguide and the at least one lens. The cavity is tilted at an angle with respect to an axis of incidence of light and the cavity has in its inside an optical medium having a refractive index different from a refractive index of surroundings of the cavity.

An embodiment of an optical rotary joint for transmission of modulated optical signals includes two units that are supported to be rotatable relative to each other and a derotating optical element. The optical rotary joint further includes at least one lens system that comprises: a micro-lens array having at least one lens for at least one of coupling light into and coupling light out of at least one light-waveguide and at least one plane-parallel cavity having two plates defining an inner space limited by parallel faces and located in a light-ray path between the at least one light-waveguide and the at least one lens. The cavity is tilted at an angle with respect to an axis of incidence of light and the cavity has in its inside an optical medium having a refractive index different from a refractive index of surroundings of the cavity.

An embodiment of a method for adjusting a lens system includes introducing liquids having refractive indices different from each other and from that of surroundings of a cavity of the lens system into the inner space of the cavity to serve as different optical media to produce different parallel displacements of a light ray passing through the cavity

BRIEF DESCRIPTION OF THE DRAWINGS

In the following, the invention will be described by way of example, without limitation of the general inventive concept, on examples of embodiment and with reference to the drawings. Other object and advantageous of the invention will become apparent upon reading the following detailed description and upon reference to the accompanying drawings in which.

Figure 1:
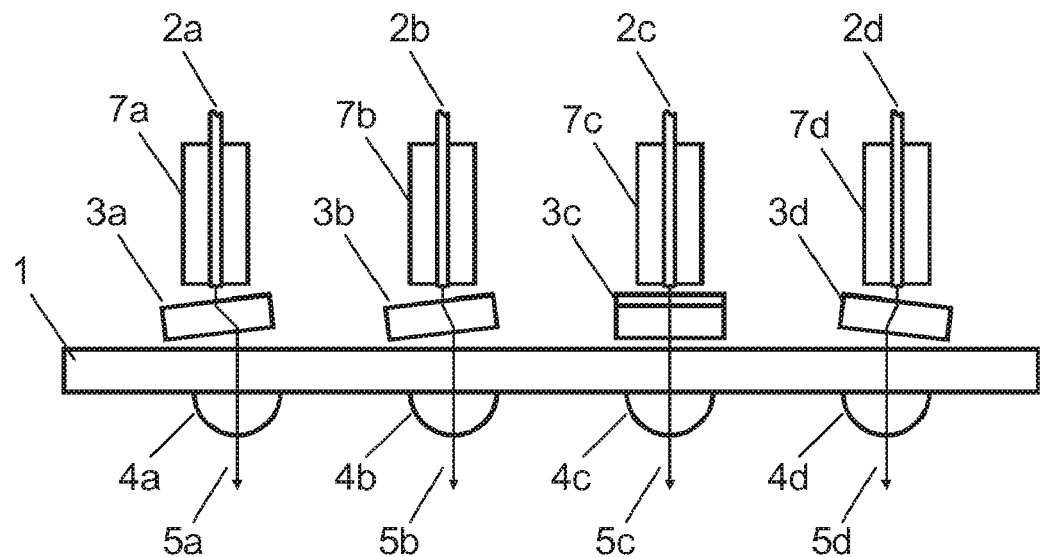
FIG. 1 schematically shows in a general form an arrangement of a lens system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

FIG. 1 schematically shows in a general form an arrangement of a lens system. Lenses 4a, 4b, 4c, and 4d are mounted on a micro-lens array 1. Light is coupled-in through light-waveguides 2a, 2b, 2c, and 2d. These light-waveguides are fixed in ferrules 7a, 7b, 7c, and 7d. The ray path of individual light rays 5a, 5b, 5c, and 5d leads from the light-waveguides via cavities 3a, 3b, 3c, and 3d into a micro-lens array having the lenses. Because of the cavities, a lateral displacement of the light rays results, so that they pass centrally through the lenses, even with a displaced arrangement of the light-waveguides. Here, the single cavities can be individually adjusted. This is shown by the different guidance of the rays in FIG. 1. Thus, in this example, the light rays 5a and 5b are deflected by the cavities 3a and 3b to the right-hand side in the plane of the drawing, with the light ray 5a being more deflected than the light ray 5b. For this, with the same geometry and with the same angle of tilt of the cavities, the medium in the cavity 3a has a lower refractive index than the medium in the cavity 3b. The light ray 5c is not deflected in the plane of the drawing. Here, the cavity 3c is rotated through 90° with respect to the other cavities in order to make possible a deflection perpendicular to the plane of the drawing. In order to compensate the lateral displacement of the light ray 5d, the angle of tilt of the cavity 3d is opposite to the angle of tilt of the cavity 3b. The here illustrated arrangement is reciprocal. Accordingly, light can be not only coupled-in from the light-waveguides in the direction of the lenses, but light can be also coupled-out in the opposite direction through the lenses into the light-waveguides.

Figure 2:
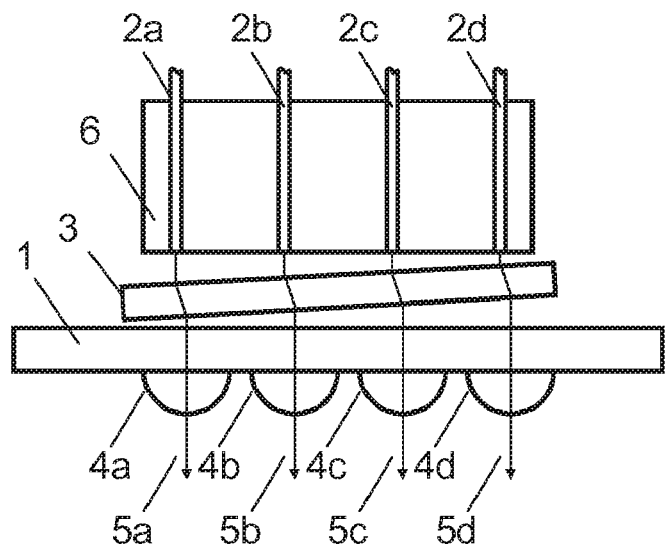
FIG. 2 shows another embodiment of an arrangement of a lens system having one single cavity for a plurality of optical channels.

FIG. 2 illustrates another embodiment of an arrangement of a lens system. In this, as distinct from FIG. 1, the light-waveguides 2a, 2b, 2c, and 2d are held by a common fiber holder 6, such as for example a fiber array. Thus, a unit results in which the individual light-waveguides need no longer be adjusted singly. Rather than this, the entire unit is aligned in accordance with the micro-lens array. For adjustment of a displacement of the ray axes, here a common cavity 3 is provided for all light rays 5a, 5b, 5c, and 5d.

Figure 3:
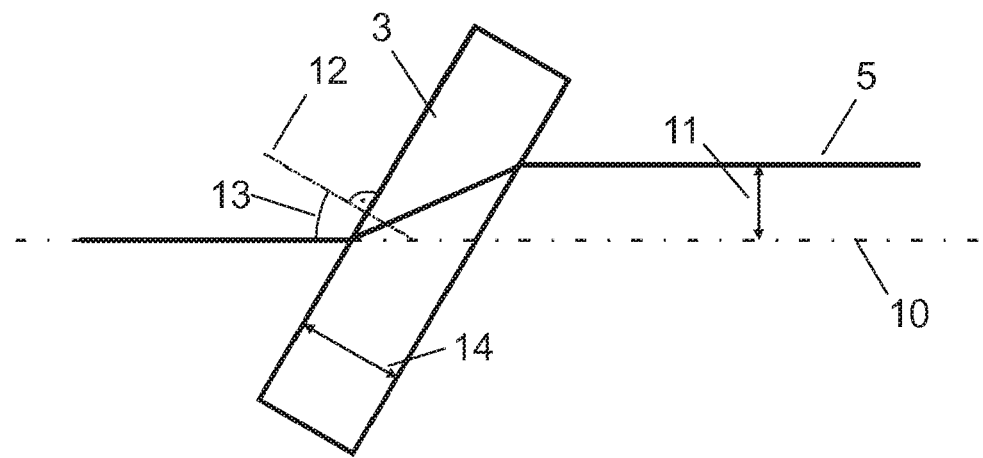
FIG. 3 shows the basic optical principle of the lens systems described in FIGS. 1 and 2.

FIG. 3 shows the basic optical principle of the lens systems described herein. For example, a light-waveguide would be located on the left-hand side of the arrangement, and a lens on the right-hand side of the arrangement (both are not shown). A light ray 5 coming from the left-hand side, for example, enters the cavity 3. This cavity 3 is comparable with a plane-parallel optical plate. On its inside, cavity 3 comprises a medium with a refractive index n2. This medium can be, for example, a gas, a liquid, or also a solid material, for example a granulate. The cavity itself is a vessel of a transparent optical material, for example of glass or of a synthetic material having on the inside a volume for accommodating the optical medium with refractive index n2. For the observations made here, the wall of the cavity is disregarded. Thus, it is fabricated preferably to be thin, i.e. of small wall thickness. Advantageously, the wall also consists of a medium having a refractive index similar to the refractive index n1 of the surroundings, or similar to the preferred refractive index n2 of the medium.

In practical use, the refractive index and the thickness of the wall must be taken into account. In the case of a wall material having a refractive index lower than the refractive index of the surroundings, this will lead to either the thickness of the cavity being chosen to be small, or the refractive index of the medium inside the cavity having to be chosen lower, because in this case an additional parallel displacement will be caused by the wall of the cavity. The same will apply correspondingly to a wall material having a refractive index lower than that of the surroundings. The cavity is tilted to the axis of incidence 10 of the light ray 5. For this, reference is made to the angle of tilt 13 between the perpendicular 12 to the entry face of the cavity and the axis of incidence 10 of the light ray. Depending on the refractive index n1 of the surroundings, the refractive index n2 of the medium inside the cavity, the thickness 14, and the angle of tilt 13, the light ray is displaced with respect to the optical axis by a parallel displacement 11 after exiting from the cavity. The parallel displacement occurs in the same plane in which also the tilting through the angle of tilt is located.

Figure 4:
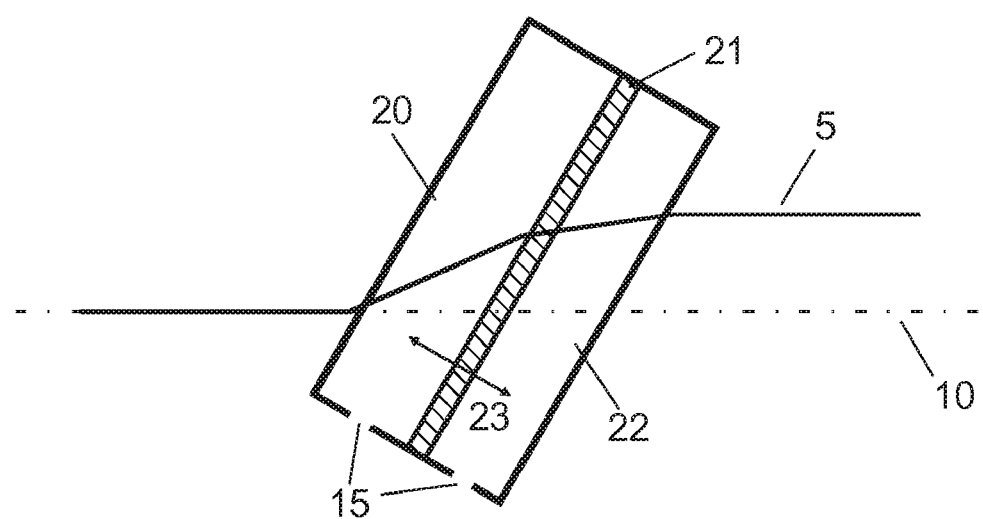
FIG. 4 shows another embodiment of an arrangement of a lens system having a movable piston.

In FIG. 4, another embodiment of an optical principle for the lens systems described herein is illustrated. In this embodiment, the thickness of the optical medium in the cavity can be varied by means of a piston. A first optical medium 20 is located on one side of the piston 21. A second optical medium 22 is located on the other side of the piston. In case the optical medium is not compressible or compressible only with difficulty, compensation openings 15 can be provided. These may also lead to a reservoir of the optical medium. In the example of the embodiment shown, the optical medium 22 has a lower refractive index than the optical medium 20. Thus, the path length through the medium 20 and through the medium 22 can be set with a displacement of the piston 21 in the direction 23. If, for example, a larger parallel displacement is needed, then the path to be traversed by the light ray and, thus, the thickness of the medium 20 having the lower refractive index is set to be larger. Here too, the thickness of the piston 21 must be taken into account for the dimensioning. Thus, the piston 21 typically consists of a material having a refractive index lower than the refractive index of the surroundings. In some embodiments, however, a piston refractive index that is higher than the refractive index of the surroundings may be used.

Figure 5:
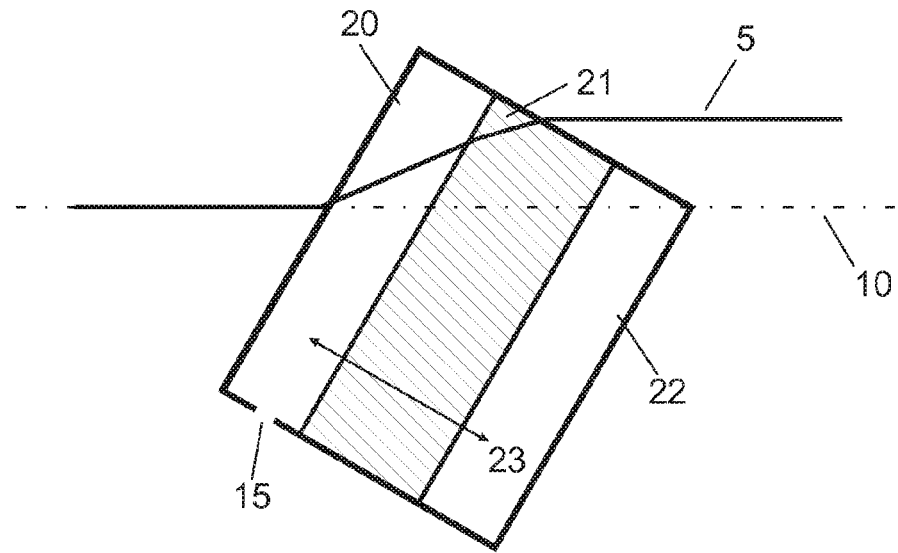
FIG. 5 shows another embodiment of an arrangement of a lens system having a movable piston.

Another embodiment of an optical principle for the lens systems described herein is illustrated in FIG. 5. Here too, an arrangement having a piston 21 has been drawn, which is similar to the previously shown arrangement. However, here the piston 21 is of a substantially larger thickness, so that the light passes through only the first optical medium 20 and the piston 21. With this, the optical properties of the medium 22 can be neglected. In this embodiment, in particular, the volume of the optical medium 22 can be connected with that of the optical medium 20 in order to produce a closed system. This helps to avoid impurities. In such a case, it is also possible to move the piston particularly easily, for example by heating. Here, it would also be possible to use a pure driving medium, serving to move the piston, in the region of the medium 22. Thus, for example, the piston could be moved by heating the driving medium.

Figure 6:
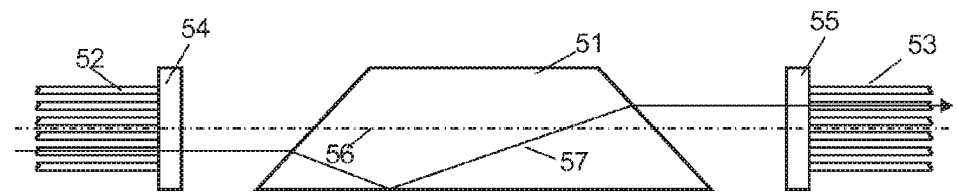
FIG. 6 shows an exemplary optical rotary joint.

FIG. 6 shows in a schematic form a rotary joint. The optical rotary joint comprises a first collimator arrangement 54 for coupling-on first light-waveguides 52 and also a second collimator arrangement 55 for coupling-on second light-waveguides 53. The second collimator arrangement 55 is supported to be rotatable relative to the first collimator arrangement 54 about the rotation axis 56. A rotation compensation element in the form of a Dove prism 51 is located in the ray path between the first collimator arrangement 54 and the second collimator arrangement 55 to compensate for the rotational movement of those arrangements. A rotation compensation element may also be referred to herein as a derotating element. An exemplary ray path of a light ray 57 is illustrated as starting from first light-waveguides 52 and passing via the first collimator arrangement 54, through the Dove prism 51, and via the second collimator arrangement 55 as far as into the second light-waveguides 53. The lens systems described in this document can be part of a collimator arrangement, or also a collimator arrangement itself.

Figure 7:
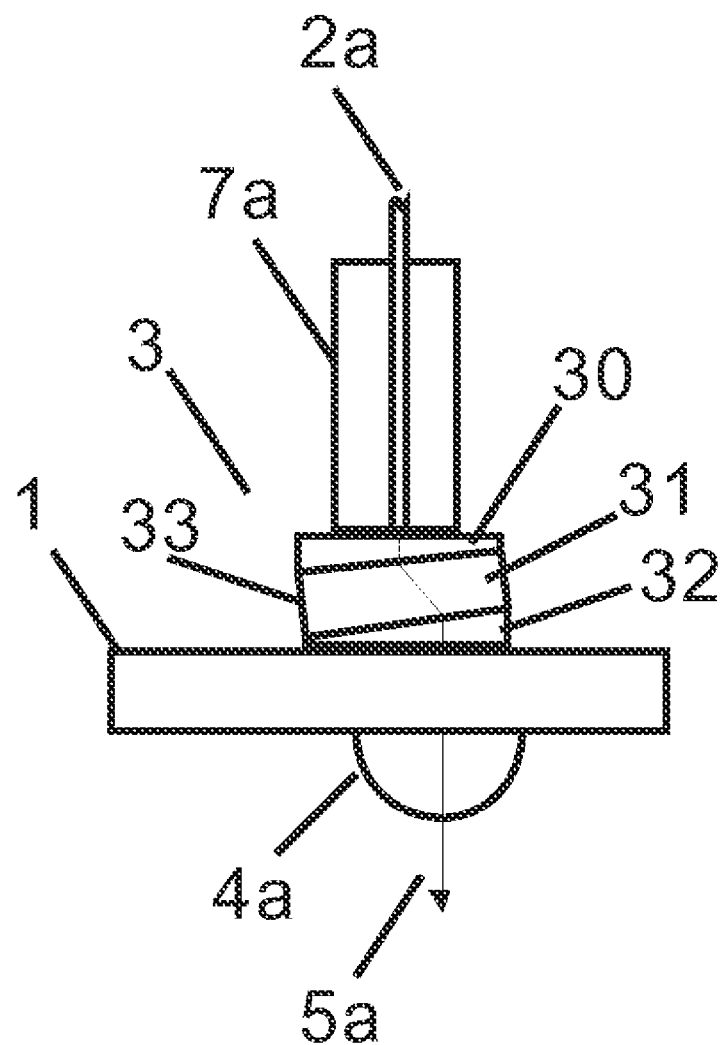
FIG. 7 shows an arrangement of a lens system having wedge-shaped plates.

FIG. 7 shows an arrangement corresponding to a part of FIG. 1. Here, the cavity comprises a first plate 30 and also a second plate 32 between which the medium 31 is enclosed. A seal 33 between the plates prevents an escape of the medium. The plates provide two parallel faces as boundaries to the inner space containing the medium. In order that the plates may have parallel faces confronting the micro-lens array and the ferrule, the plates are designed to be wedge-shaped. Alternatively however, the plates could be also plane-parallel glass plates.

DETAILED DESCRIPTION OF PREFERRED EMBODIMENTS

As shown in FIGS. 1 and 2, the lens systems described herein comprise at least one support plate with at least one lens, such as any one or more of lenses 4a, 4b, 4c, and 4d. At least one light-waveguide, such as one or more of waveguides 2a, 2b, 2c, and 2d, is provided for coupling-in or coupling-out light. These light-waveguides may be respectively held in ferrules, such as ferrules 7a, 7b, 7c, and 7d or collectively held in a fiber holder, such as fiber holder 6. Plane-parallel cavities, such as cavities 3a, 3b, 3c, and 3d, are provided in an optical path between the light-waveguides and the lenses. These cavities are filled with a medium having a given refractive index n2. Furthermore, these cavities are tilted at a given angle α to the path of rays between the light-waveguide and the lens. When light passes through these tilted cavities, a parallel displacement of the light rays occurs. This parallel displacement is a function of the refractive index n1 of the surrounding medium, and also the refractive index n2 of the medium in the cavities. The medium in the cavities can be, for example, a gas such as air, a liquid, a granulate, or also an adhesive. The refractive index of the medium can be smaller or greater than the refractive index of the surroundings. Furthermore, this parallel displacement Δ is determined by the thickness d of the cavities and also the tilt angle α according to the following formula:

$$\Delta = d \cdot \frac{\sin\left[\alpha - \arcsin\left(\frac{n_1}{n_2} \cdot \sin\alpha\right)\right]}{\cos\left[\arcsin\left(\frac{n_1}{n_2} \cdot \sin\alpha\right)\right]}$$

A displacement between a light-waveguide and a lens can be compensated with a suitably dimensioned cavity.

In an advantageous manner, a cavity of the lens systems described herein comprises two boundary plates which define an inner space bounded by two parallel faces. An optical medium is located between the two boundary plates. The two boundary plates are situated in the optical ray path. Thus, a cavity of the lens systems described herein may be a vessel of glass or a synthetic resin.

An especially advantageous medium is one that becomes hardened or cured after some time. Thus, it can be an adhesive such as an epoxy resin or a silicone resin. It can be also an adhesive that is cured by ultra-violet radiation.

In another advantageous embodiment, a cavity is filled with the material of its boundary plates. It, thus, corresponds to one single glass plate of suitable thickness, or a plate of an optical material. Thus, a lateral displacement of the ray path can be achieved also with a plate of this kind.

It is important that the cavity and/or plate can be set or adjusted so that the ray path can be adjusted thereby. Thus, advantageously the ray path can be rotated about an axis parallel to the optical axis. Optionally, the cavity also can be displaceable within the optical path. Optionally, also the angle of tilt of the cavity with respect to the micro-lens array can be varied.

In an advantageous embodiment, two cavities in succession are provided in the beam path, the two cavities being in positions rotated through 90° with respect to each other in a plane perpendicular to the optical axis (e.g., axis of incidence 10 in FIGS. 3-5). Thereby, any parallel displacements in a plane perpendicular to the optical axis can be compensated. Basically, the two cavities can be rotated with respect to each other also through other angles than 90°. In this case, the covered region of possible displacement will not be of circular but of elliptical shape.

In another advantageous embodiment, the parallel displacement of a cavity can be set by inserting a medium into the cavity, preferably a liquid having a defined refractive index. These liquids are commercially available, for example as optical oils having refractive indices graded in steps of Δn=0.002. Furthermore, for adaptation, it is also possible for different liquids to be mixed with each other to set the required refractive index.

In another embodiment, a plurality of cavities can be arranged in cascade. The different cavities can have different thicknesses, and/or can also comprise different media. In this embodiment, it is advantageous for the parallel displacements of the cavities to be graded in binary steps. Thus, for example, cavities can be provided which have standardized parallel displacements of 1, 2, 4, 8, 16, etc. With these, desired whole number values of parallel displacements can be achieved in a simple manner.

In another embodiment, liquids are supplied to the cavities via fluid channels. Similarly, also a reservoir for a liquid could be provided close to a cavity. The introduction of the liquid from the reservoir into the cavity can be effected for example by thermal expansion or vapor pressure. For this, a small vapor bubble can be produced by spot heating at a given position of the reservoir by means of a laser, which then urges the liquid into the cavity. In this way, the liquid could also be removed from the cavity.

In another embodiment, the thickness of the optical medium in the cavity can be adjusted with a piston. For this, preferably a micro-mechanical system with a suitably adjustable piston is provided. As an alternative, operation of the piston can be effected with a piezo-drive or a piezo-pump as used, for example, with ink-jet printers.

Furthermore, the optical property of the medium in the cavity can be changed instead of exchanging the medium in the cavity. Here, temporary as well as permanent changes, are possible. Thus, for example, the refractive index can be set accurately with a temporary change such as, for example, a density change by heating. Further change of the refractive index can be achieved, for example, by phase change with which the optical properties distinctly change. Thus, this operation can be performed, for example, specifically on writable or re-writable optical data recording media with a laser. Basically, the medium can be affected by all kinds of electric, magnetic, or electromagnetic fields. It can also be changed by pressure, temperature, and other physical effects.

It is also possible to dispose a further optical element such as a light-guiding fiber or a micro-lens array in direct contact with, or separated by a small air gap from, a cavity in the lens systems described herein. For this, preferably at least one of the faces (of the optical element or the cavity) is designed to extend obliquely in order to increase the return losses. Alternatively or additionally, at least one of the faces may be coated to be anti-reflective.

In some cases, the walls of each cavity may be beveled or wedge-shaped in order to increase return losses.

The optical rotary joints described herein have at least one lens system as described herein instead of the usual collimator arrangements or lens systems. Accordingly, a rotary joint as disclosed in U.S. Pat. No. 5,568,578 can be designed to have, instead of GRIN lenses on each side of the Dove prism, a lens system as described herein on each side. However, rotary joints without a derotating element, such as for example single-channel rotary joints, also can be equipped with a lens systems described herein. Similarly, rotary joints which use, for example, a mirror-coated trench or segments thereof as light guides, can be provided with a lens systems described herein.

As described in reference to FIG. 6, an optical rotary joint may include at least one first lens system 54 for coupling-on first light-waveguides 52. Furthermore, at least one second lens system 55 may be provided for coupling-on second light-waveguides. Both lens systems are supported to be rotatable relative to each other about a rotation axis 56, and are optically connected to each other via a rotation compensation optical element in the light path between both lens systems. At least one of the lens systems has the features as set out above, such as with respect to FIGS. 1-5. Optionally, the rotation compensation optical element can be a Dove prism or also an Abbe-König prism.

The optical rotary joint can be put into practice basically with all derotating optical elements. For the sake of clarity, reference is here made to a Dove prism. However, an Abbe-König prism is also usable as a derotating optical element.

A method comprises the introduction of liquids of different refractive indices into the cavities in the beam path of a lens system described herein for adjusting the required parallel displacement.

It will be appreciated to those skilled in the art having the benefit of this disclosure that this invention is believed to provide a lens system particularly for use in optical rotary joints, an optical rotary joint using the lens system, and also to a method for adjusting a lens system of this kind. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A lens system comprising:
a micro-lens array having at least one lens for at least one of coupling light into and coupling light out of at least one light-waveguide;
at least one cavity defined between two parallel plates and substantially filled with a gas or a liquid medium, the parallel plates being located in a light-ray path between the at least one light-waveguide and the at least one lens;
wherein the cavity is tilted at an angle with respect to an axis of incidence of light; and
wherein the medium has a refractive index different from a refractive index surrounding the cavity.

2. The lens system according to claim 1, wherein two cavities are provided in succession in the ray path, the two cavities being rotated with respect to each other in a plane perpendicular to the axis of incidence.

3. The lens system according to claim 1, wherein a plurality of cavities are provided in succession in the ray path, the cavities causing different values of parallel displacement of a light ray passing through the cavities.

4. The lens system according to claim 3, wherein the values of the parallel displacements are graded in steps of powers of two.

5. The lens system according to claim 1, further comprising fluid channels for feeding the at least one cavity with the liquid medium.

6. The lens system according to claim 1, further comprising means for introducing the liquid medium, which is a liquid optical medium, into the at least one cavity by means of vapor pressure.

7. The lens system according to claim 6, further comprising a laser for vaporizing a part of the liquid.

8. The lens system according to claim 1, further comprising at least one piston for adjusting a thickness of the medium in the at least one cavity.

9. The lens system according to claim 1, wherein optical properties of the medium in the at least one cavity can be changed specifically by an action from outside the cavity.

10. An optical rotary joint for transmission of modulated optical signals, comprising:
two units that are supported to be rotatable relative to each other;
a rotation compensation optical element; and
at least one lens system comprising:
a micro-lens array having at least one lens for at least one of coupling light into and coupling light out of at least one light-waveguide;
at least one plane-parallel cavity having two plates defining an inner space limited by parallel faces and located in a light-ray path between the at least one light-waveguide and the at least one lens;
wherein the cavity is tilted at an angle with respect to an axis of incidence of light; and
wherein inside the cavity is a gas or a liquid medium having a refractive index different from a refractive index surrounding the cavity.

11. A lens system comprising:
a micro-lens array having at least one lens for at least one of coupling light into and coupling light out of at least one light-waveguide;
at least one plane-parallel cavity having two plates defining an inner space limited by parallel faces and located in a light-ray path between the at least one light-waveguide and the at least one lens;
wherein the cavity is tilted at an angle with respect to an axis of incidence of light; and
wherein inside the cavity is an optical medium having a refractive index different from a refractive index surrounding the cavity, and wherein the optical properties of the medium in the cavity can be changed by an action from outside the cavity.

* * * * *